No. 648,121. Patented Apr. 24, 1900.
C. H. CARPENTER.
NECK YOKE CENTER.
(Application filed Jan. 15, 1900.)
(No Model.)
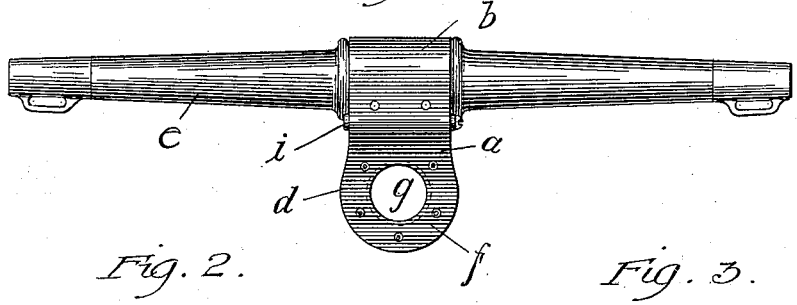
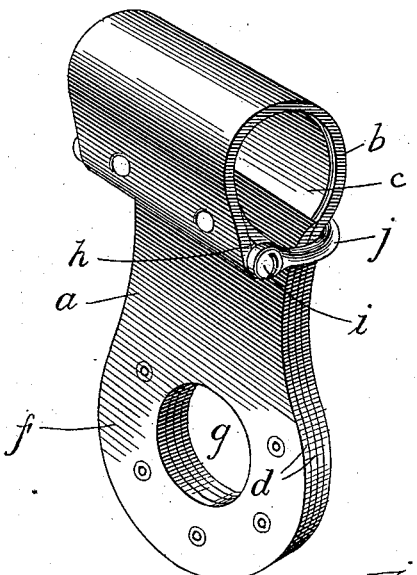
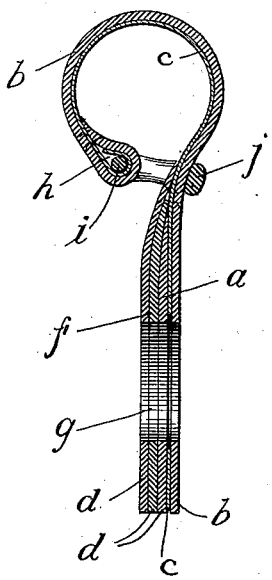
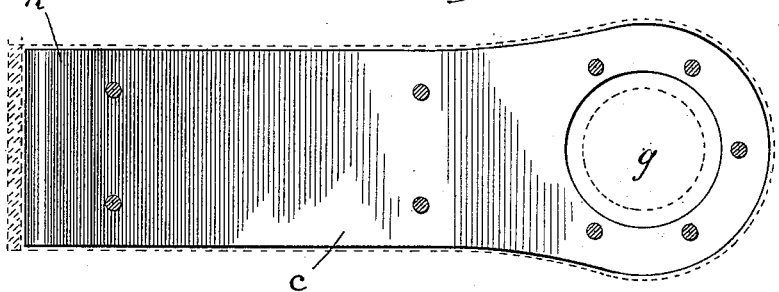
Witnesses:
Frank S. Blanchard
Arthur M. Cox
Inventor
Charles H. Carpenter
By Jesse & H. M. Cox
Attorneys.
THE NORRIS PETERS CO., PHOTO-LITHO., WASHINGTON, D. C.

UNITED STATES PATENT OFFICE.

CHARLES H. CARPENTER, OF CHICAGO, ILLINOIS.

NECK-YOKE CENTER.

SPECIFICATION forming part of Letters Patent No. 648,121, dated April 24, 1900.

Application filed January 15, 1900. Serial No. 1,527. (No model.)

*To all whom it may concern:*

Be it known that I, CHARLES H. CARPENTER, a citizen of the United States, residing in the city of Chicago, county of Cook, and State of Illinois, have invented a new and useful Improvement in Neck-Yoke Centers, of which the following is a specification.

My invention relates to neck-yoke centers or holdbacks which are adjustable to yoke-poles or cross-bars of different diameters; and the object of my invention is to provide an adjustable yoke-center having lightness, flexibility, and compactness, combined with great strength and durability. I attain this object by the mechanism illustrated in the accompanying drawings, in which—

Figure 1 is a front view of a yoke and yoke-center embodying my invention. Fig. 2 is a perspective view of the yoke-center bent to form the clasp-loop. Fig. 3 is a transverse sectional view of the yoke-center doubled to form the loop, as in Figs. 1 and 2. Said Fig. 3 shows the disposition of the reinforcing metallic lining and the eye formed therein around the removable bolt of the stirrup. Fig. 4 is a face view of the metallic lining straightened, except at the eye wherein the stirrup-bolt is inclosed. The position of the leather strips relatively to said lining is shown in dotted lines.

Similar letters refer to similar parts throughout the several views.

The neck-yoke center $a$ comprises the outer layer $b$, consisting of leather, the lining $c$, consisting of metal, and the layers $d\,d$, consisting, preferably, of leather and varying in number according to the thickness and strength required. Said layers $b$ and $c$ are of sufficient length to form a loop for inclosing the yoke cross-bar $e$ and to form also a depending portion or butt $f$, whereto the pole of the vehicle may be attached. At said butt $f$ said layers $b$, $c$, and $d\,d$ are substantially coextensive and are correspondingly apertured, so as to form the eye or opening $g$ for receiving and supporting the forward extremity of the pole of the vehicle. The chief function of said layers $d\,d$ is to thicken said butt $f$, so as to provide a greater bearing-surface for the said pole and also to give an appearance of strength to the yoke-center. In order to prevent abrasion of said pole by the metal lining $c$, the latter is preferably cut away at said eye $g$ to a diameter somewhat greater than the corresponding apertures in the layers $b$ and $d\,d$. The layers composing said butt $f$ are fastened together by means of rivets, and the inner layers $d\,d$ taper off toward the looped extremity of the yoke-center and terminate a short distance above the said eye $g$. The lining $c$ consists of a flexible sheet of metal and is preferably galvanized to prevent rust. Said lining $c$ and outer layer $b$ are of substantially the same size and outline; but the edges of said outer strip project slightly beyond said lining, thereby preventing the latter from coming into contact with exterior objects and also rendering said lining substantially invisible, particularly at the said butt $f$. At the extremity of said yoke-center opposite to said butt $f$ the said outer layer $b$ and lining $c$ make a short return-bend, thereby forming an eye $h$ for receiving the bolt $i$ of the stirrup $j$. Said eye is so made that the lining $c$ forms the interior surface thereof, thereby greatly lessening the wearing effect of the said bolt $i$. Said eye $h$ is made permanent by riveting. The stirrup $j$ above mentioned consists of an approximately U-shaped rod or bar, preferably of metal, so constructed that the said bolt $i$ may extend between the extremities thereof and be removably secured thereto. When the yoke-center $a$ is to be attached to the cross-bar $e$, the extremity of said center having the eye $h$ is passed around said bar, the lining $c$ lying nearest thereto. The loop thus formed is completed by means of the stirrup $j$ and bolt $i$, said stirrup being attached in such a manner as to engage said layer $b$ on the outer surface thereof and cause the extremities of said stirrup to assume a position adjacent to the extremities of said eye $h$. The bolt $i$ is then passed through said eye $h$ and secured to the said extremities of said stirrup. As the layers $b$ and $c$ are flexible, the stirrup $j$ may slide freely upon the outer surface of the layer $b$, and the yoke-center is therefore adjustable to any size of cross-bar in the usual manner.

I attach particular importance to the use of the metallic lining as above described, and the advantages of this construction are considerable. In the forms of adjustable centers heretofore in use it has been necessary in order to obtain the requisite strength to construct the looped extremity of many layers of leather, usually not less than four. In the four-layer construction the eye inclosing the removable bolt $i$ of the stirrup $j$ is two layers in thickness, a greater thickness being impracticable and substantially impossible both on account of the stiffness of the leather and the lack of space within said stirrup. In order to lie closely upon the cross-bar and at the same time be adjustable to various sizes of bars, it is essential that the distance between the bolt $i$ and the base of the U-shaped stirrup $j$ be small. In the four-layer construction there are necessarily at least six layers within said stirrup between said base and said bolt, and this causes a crowding of the parts, so as to interfere with the sliding of said base upon the outer layer $b$. By my construction little thickness is required at said stirrup $j$, thus allowing great freedom of operation combined with reduced dimensions.

The greatest strength of the yoke-center is substantially equal to the resistance of the eye $h$ to the shearing stress of the bolt $i$. By the use of the metallic lining $c$ it is possible to form said eye $h$ by a return-bend of both the outer layer $b$ and said lining $c$. This affords a strength at said eye equal to the strength at any portion of said center, whereas in the construction heretofore employed the strength of the eye has been of necessity less than the strength at the other portions of the yoke-center, due to the necessity of decreased thickness of material inclosing the stirrup-bolt $i$. Again, it is desirable that the yoke-center $a$ should lie close upon the cross-bar $e$, and this is attained in a high degree in my device. By the use of said lining $c$ the process of manufacture is simplified, for the reason that said lining affords sufficient "body" to make practicable the use of rivets for fastening the layers together instead of the stitching, as heretofore.

What I claim as new, and desire to secure by Letters Patent, is—

1. An adjustable neck-yoke center consisting of a layer of leather, or similar flexible material, and a layer of flexible sheet metal, said layers being suitably attached together and bent to form a loop with the metal layer on the inside thereof, and both of said layers being folded inward upon themselves at the end of said loop to form a metal-lined eye, combined with a metal stirrup the cross-bolt of which passes through said eye and the outer bar of which is free to slide or move on the said leather layer as the loop is tightened around the neck-yoke cross-bar.

2. In an adjustable neck-yoke center, the combination of strips, one whereof is of leather, and the second whereof is metallic; said strips extending throughout the length of the yoke-center and forming a metal-lined eye at one extremity for inclosing the stirrup-bolt; a stirrup and removable stirrup-bolt whereby said center may inclose the cross-bar of a yoke; and a butt, thickened by means of supplementary strips and having an aperture therein for receiving the pole of a vehicle.

CHARLES H. CARPENTER.

Witnesses:
CHARLES L. HERRICK,
ARTHUR M. COX.